(12) United States Patent
Charles et al.

(10) Patent No.: US 9,456,631 B2
(45) Date of Patent: Oct. 4, 2016

(54) ELECTRICAL KITCHEN APPLIANCE COMPRISING A PRESSING SCREW

(75) Inventors: Patrick Charles, Louey (FR); Augustin Dominguez, Tarbes (FR)

(73) Assignee: SEB S.A., Ecully (FR)

( * ) Notice: Subject to any disclaimer, the term of this patent is extended or adjusted under 35 U.S.C. 154(b) by 540 days.

(21) Appl. No.: 13/883,878

(22) PCT Filed: Nov. 4, 2011

(86) PCT No.: PCT/FR2011/052580
§ 371 (c)(1),
(2), (4) Date: Aug. 6, 2013

(87) PCT Pub. No.: WO2012/062988
PCT Pub. Date: May 18, 2012

(65) Prior Publication Data
US 2013/0327232 A1    Dec. 12, 2013

(30) Foreign Application Priority Data

Nov. 9, 2010  (FR) ...................................... 10 59260

(51) Int. Cl.
| *A23N 1/00* | (2006.01) |
| *A23N 1/02* | (2006.01) |
| *B30B 9/14* | (2006.01) |
| *A47J 19/06* | (2006.01) |
| *A47J 19/02* | (2006.01) |
| *B30B 9/12* | (2006.01) |

(52) U.S. Cl.
CPC . *A23N 1/02* (2013.01); *A23N 1/00* (2013.01); *A47J 19/025* (2013.01); *A47J 19/06* (2013.01); *B30B 9/121* (2013.01); *B30B 9/128* (2013.01); *B30B 9/14* (2013.01)

(58) Field of Classification Search
CPC .......... A23N 1/02; A23N 1/003; A23N 1/00; A47J 19/06; B30B 9/14; B30B 9/12; B01F 7/00416
USPC ...... 99/510, 513, 502, 495; 241/260.1, 82.1; 100/117, 145; 366/133, 186, 319, 321, 366/322, 318
See application file for complete search history.

(56) References Cited

U.S. PATENT DOCUMENTS

| 2,304,929 | A | * | 12/1942 | Keith | ............................... 99/512 |
| 2,912,923 | A | * | 11/1959 | Jung | .............................. 100/117 |
| 3,478,679 | A | * | 11/1969 | Bauserman | ................... 100/117 |
| 4,140,400 | A | * | 2/1979 | Lovegrove | ...................... 366/81 |
| 8,091,473 | B2 | | 1/2012 | Kim | |

FOREIGN PATENT DOCUMENTS

| DE | 1185343 B | 1/1965 |
| FR | 2932665 A1 | 12/2009 |
| FR | 2938415 A1 | 5/2010 |
| FR | 2939355 A1 | 6/2010 |
| WO | 2007148872 A1 | 12/2007 |

* cited by examiner

*Primary Examiner* — Reginald L Alexander
(74) *Attorney, Agent, or Firm* — The Webb Law Firm

(57) ABSTRACT

Provided is an electrical kitchen appliance including a pressing screw rotated about a substantially vertical axis in a work chamber having a food insertion chute communicating with the upper end of the pressing screw, and a discharge outlet. The pressing screw includes at least two main threads providing at least two separate passages for inserting food, each main thread having a lower face extending over at least one quarter of the circumference of the pressing screw.

17 Claims, 4 Drawing Sheets

ELECTRICAL KITCHEN APPLIANCE COMPRISING A PRESSING SCREW

BACKGROUND OF THE INVENTION

1. Field of the Invention

The present invention relates to the technical field of electrical kitchen appliances comprising a pressing screw arranged in a work chamber about a mainly vertical axis of rotation.

The present invention more particularly relates to electrical kitchen appliances of the press type comprising a pressing screw associated with a filter element for making juices or purées, and/or of the mincer type comprising a pressing screw associated with a rotary blade at the outlet for preparing minced foods.

2. Description of Related Art

Document WO 2007 148872 discloses an appliance comprising a pressing screw arranged about a vertical axis in a work container positioned on a motor case. The pressing screw is surrounded by a pressing filter. The pressing screw is driven in rotation by its base and has an upper axis inserted in a lower central recess of the lid closing the work container. This bidirectional securing of the pressing screw makes it possible to reduce the vibrations of the pressing screw. This arrangement thus makes it possible to reduce the noise of the appliance. This arrangement also makes it possible to prevent wear on the pressing screw.

SUMMARY OF THE INVENTION

The object of the present invention is to control the forces exerted by the pressing screw more effectively while the appliance is in operation.

This object is achieved with an electrical kitchen appliance comprising a pressing screw driven in rotation about a mainly vertical axis in a work chamber having a food insertion chute communicating with the upper end of the pressing screw, and a discharge outlet, wherein the pressing screw comprises at least two main threads providing at least two separate passages for inserting food and wherein each main thread has a lower face extending over at least a quarter of the circumference of the pressing screw. These arrangements permit a more even distribution of the food to be pressed around the pressing screw, which helps reduce vibrations and allows a more economic construction.

Advantageously then, for a better distribution of the food the lower face of each main thread extends over at least half of the circumference of the pressing screw.

Advantageously still, for facilitating the insertion of food in the various channels provided by the pressing screw, the main threads extend to the upper end of the pressing screw.

Advantageously still, for improving the pressing yield, the main threads extend over at least two thirds of the height of the pressing screw about the axis.

Advantageously still, for increasing the area of the pressing surfaces, at least one secondary thread arranged between two main threads is interrupted at a distance from the upper end of the pressing screw.

Advantageously still, a pre-cutting disc is arranged between the food insertion chute and the pressing screw, the pre-cutting disc comprising at least one passage for the cut food positioned opposite each passage for inserting food. This arrangement makes it possible to facilitate the pressing of food inserted via the chute in that the food is cut up prior to pressing and the cut pieces are inserted into each of the channels provided by the pressing screw.

According to an advantageous embodiment, the pre-cutting disc is detachable from the pressing screw. Alternatively, the pressing screw could in particular comprise pre-cutting members formed on the upper end of the lower face of the main threads.

Advantageously then, for facilitating the cutting of food inserted via the chute, the pre-cutting disc comprises lower drive configurations designed for cooperating with upper drive configurations provided on the upper end of the main threads of the pressing screw.

Advantageously still, for facilitating the distribution of the food in the various channels of the pressing screw and for improving the retention of the pre-cutting disc, if present, the main threads widen towards the upper end of the pressing screw.

According to an advantageous embodiment, the pressing screw is mounted detachably in the work chamber.

According to a preferred embodiment, the electrical kitchen appliance comprises a case housing an electric motor connected to an upper drive output designed for rotating the pressing screw. Optionally, the pressing screw can be driven by means of a transmission member. The pre-cutting disc can in particular be associated with said transmission member.

According to a preferred embodiment, the work chamber is mounted detachably on the case. Alternatively, the case could be integrally formed with the work chamber.

According to an advantageous embodiment, the work chamber comprises a work container closed by a lid, the work container having the discharge outlet, the lid having the food insertion chute.

According to an embodiment adapted for obtaining juice or purées, a filter element divides the work chamber into a first compartment housing the pressing screw and a second compartment having the discharge outlet.

According to an embodiment adapted for obtaining minced preparations, at least one grate and at least one rotary blade are arranged between the pressing screw and the discharge outlet.

According to a preferred embodiment adapted to the size of household appliances, the pressing screw has a 2, 3, or 4-fold symmetry.

BRIEF DESCRIPTION OF THE DRAWINGS

The invention will be better understood by studying an example of embodiment, which is in no way limiting and which is illustrated in the appended figures, wherein.

DETAILED DESCRIPTION OF THE INVENTION

Figure 1:
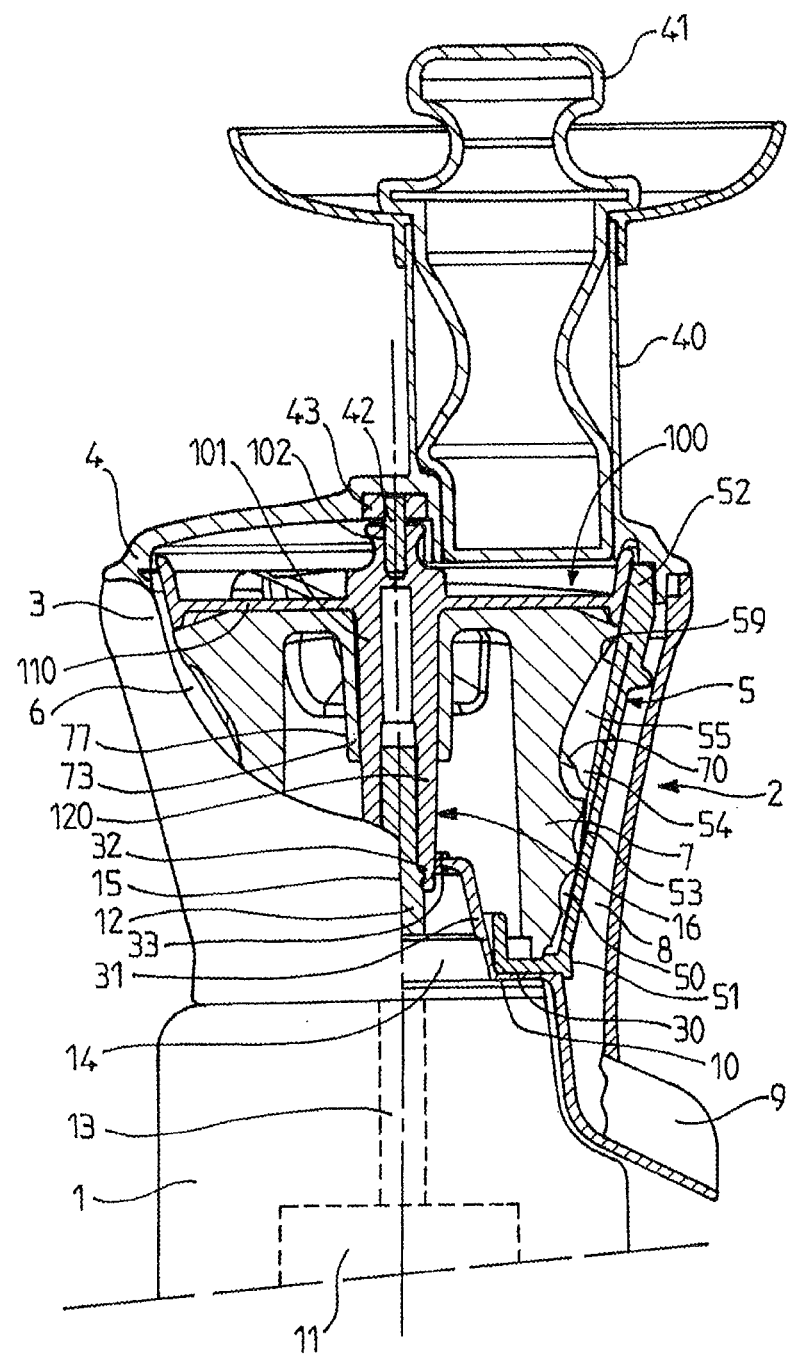
FIG. 1 illustrates an example of the electrical kitchen appliance of the invention, shown in a vertical and partially cutaway view with the case housing the motor illustrated schematically.

The electrical kitchen appliance illustrated in FIG. 1 comprises a case 1 and a work chamber 2 having a food insertion chute 40, and a discharge outlet 9. A pressing screw 7 is driven in rotation about a mainly vertical axis 15 in the work chamber 2. The food insertion chute 40 communicates with the upper end of the pressing screw 7.

A filter element 5 divides the work chamber 2 into a first compartment 6 housing the pressing screw 7 and into a second compartment 8 having the discharge outlet 9.

The work chamber 2 comprises a work container 3 closed by a lid 4. The work container 3 has the discharge outlet 9.

The case 1 forms a base 10 on which the work container 3 rests. The case 1 houses an electric motor 11, illustrated schematically. The electric motor 11 is connected to an upper drive output 12, optionally by means of a schematically illustrated transmission device 13. The upper drive output 12 is arranged on the base 10.

Figure 6:
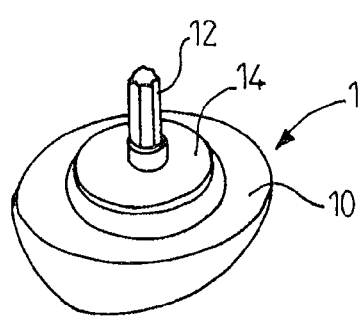
FIG. 6 shows the upper drive output and a part of the case of the appliance illustrated in FIG. 1.

More particularly, as can be seen in FIGS. 1 and 6, the upper drive output 12 exits from a protuberance 14 of the base 10. The upper drive output 12 is driven in rotation about an axis 15. The upper drive output 12 is designed for driving the pressing screw 7, optionally by means of a transmission member.

In the example of embodiment illustrated in FIG. 1, the work container 3 is mounted detachably on the case 1. Hence the work chamber 2 is mounted detachably on the case 1. The filter element 5 is mounted detachably in the work container 3. The pressing screw 7 is mounted detachably in the work chamber 2.

The work container 3 has an upper opening closed by the lid 4. The discharge outlet 9 is provided in a lower part of the work container 3 on the outside of the filter element 5. The work container 3 has a bottom wall 30 comprising an axial boss designed for capping the protuberance 14.

The work container 3 is designed for the passage of a transmission means 16 between the electric motor 11 and the pressing screw 7. To this end, the axial boss 31 has an axial opening 32. A gasket 33 is advantageously installed in the axial opening 32 for ensuring a seal with the transmission means 16.

The lid 4 can be locked onto the work container 3, in particular by means of bayonet catches (not shown in the figures). The lid 4 has the food insertion chute 40. The food insertion chute 40 is positioned laterally in relation to the axis of the pressing screw 7. A pusher 41 is arranged in the food insertion chute 40. The lid 4 comprises an axial guide member 42, which is advantageously flexibly mounted in an elastic element 43.

The filter element 5 comprises at least one filtering part 55 arranged opposite the pressing screw 7. In order to facilitate juice extraction, the filtering part or parts 55 are arranged mainly between the pressing screw 7 and the discharge outlet 9.

As shown in FIG. 1, the filter element surrounds the pressing screw. The filtering part or parts 55 are arranged next to the discharge outlet 9. Preference is given to the filtering part or parts 55 being arranged in one half of the work chamber 2 on both sides of the discharge opening 9.

The filter element advantageously comprises a base 51 and an upper crown 52, the filtering part or parts 55 being arranged between the base 51 and the upper crown 52.

An intermediate ring 53 can be arranged between the base 51 and the upper crown 52. More particularly, a lower filtering part 50 is arranged between the base 51 and the intermediate ring 53. An upper filtering part 54 is arranged between the intermediate ring 53 and the upper crown 52.

More particularly, the filter element 5 rests on the bottom wall 30 of the work container 3. The lid 4 retains the upper crown 52 of the filter element 5.

Figure 2:
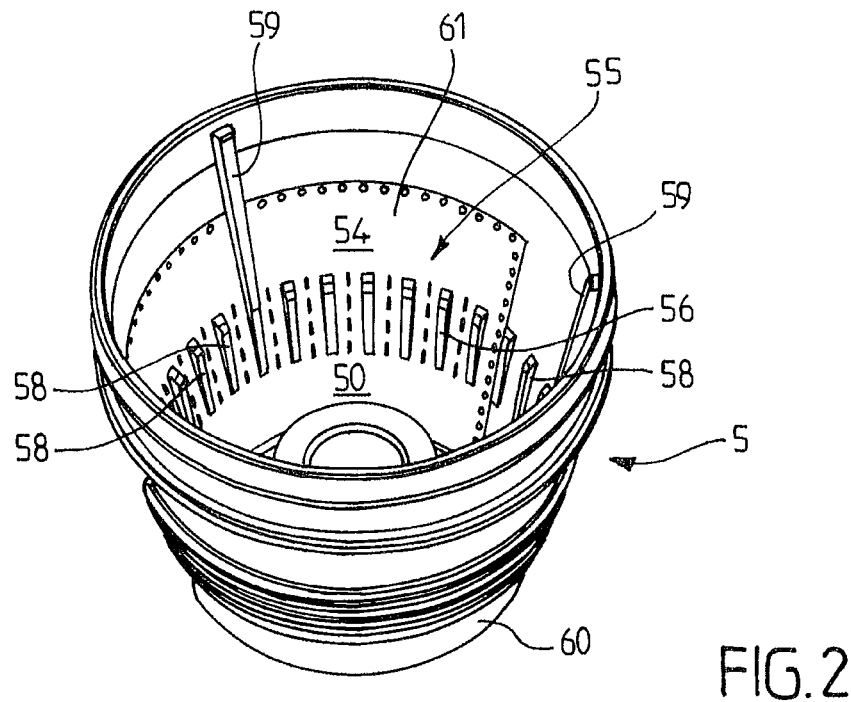
FIG. 2 is a perspective view from above of a filter element housed in the work chamber of the appliance illustrated in FIG. 1, with FIG. 3 illustrating the filter element and the work container of the appliance illustrated in FIG. 1 from another angle.

As can be seen in FIG. 2, the filter element 5 comprises an internal ribbed zone 56 extending above at least a lower filtering part. The internal ribbed zone 56 has, for example, a series of vertical intermediate ribs 58. The internal ribbed zone 56 advantageously extends beyond the filtering part or parts 56 [sic]. The internal ribbed zone 56 is preferably annular for enabling the grinding of food around the entire pressing screw.

Figure 3:
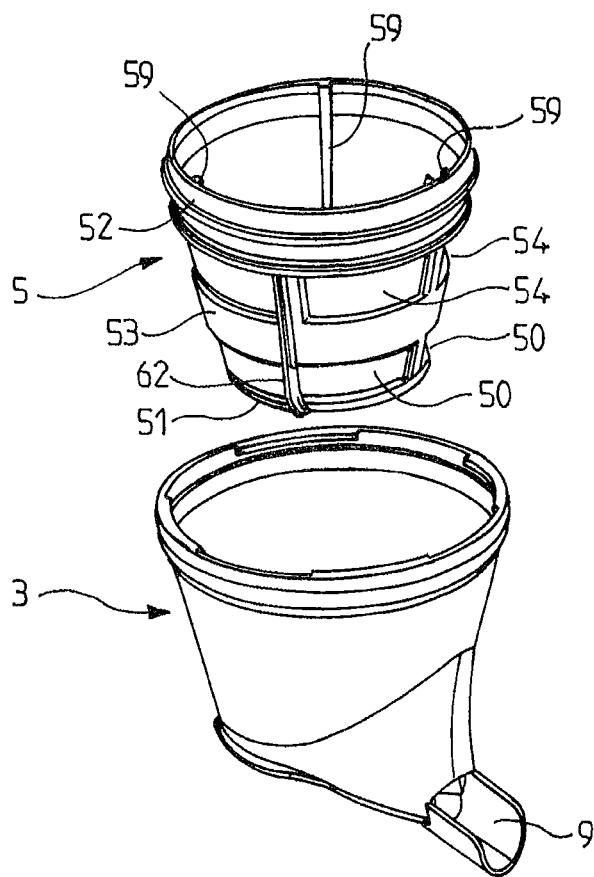

As can be seen in FIGS. 1 through 3, the filter element 5 has at least one upper filtering part 54 extending above the internal ribbed zone 56.

According to a preferred embodiment, the upper filtering part or parts 54 have filtering passages larger in size than the filtering passages of the lower filtering part or parts 50.

As can be seen in FIGS. 1 through 3, the filter element 5 comprises at least one upper rib 59 extending above the upper filtering part or parts. The upper rib or ribs cooperate with the threads of the upper part of the pressing screw 7 for conveying the food towards the pressing zones in the vicinity of the filtering part or parts 55.

As shown in FIGS. 1 through 3, the filter element 5 comprises a plastic filter body 60 molded onto at least one perforated metal sheet 61 forming the filtering part or parts 55. The upper rib or ribs 59 and the intermediate ribs can thus emerge directly from the filter body 60. However, other embodiments are also conceivable, such as one or a plurality of filtering parts 55 connected by adhesive bonding to the filter body 60 or inserted in abutment with restraining configurations of the filter body 60.

The filter element 5 is indexed in relation to the work container 3 by any known means such as, specifically, one or a plurality of configurations 62.

Figure 4:
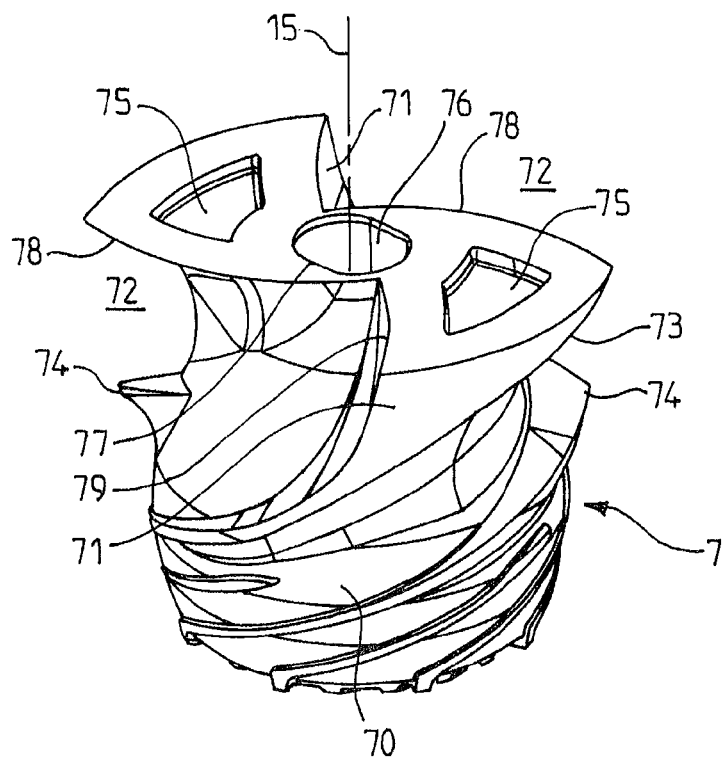
FIGS. 4 and 5 are a perspective view from above and a plan view from above, respectively, of a pressing screw housed in the work chamber of the appliance illustrated in Figure 1.
Figure 5:
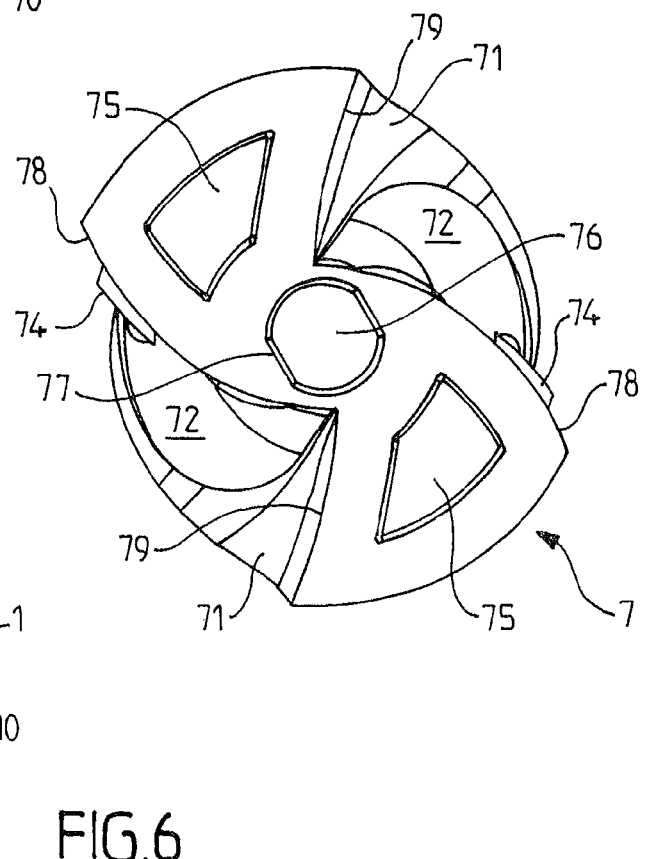

As can be seen in FIGS. 1, 4, and 5, the pressing screw 7 comprises a screw body 70 equipped with threads designed for pushing the food against the filter element 5.

As can be more readily seen in FIGS. 4 and 5, the pressing screw 7 comprises two main threads 71 providing two separate passages 72 for inserting food. The pressing screw 7 has a 2-fold symmetry, which allows more even distribution of the food to be pressed around the pressing screw 7.

The main threads 71 extend to the upper end of the pressing screw 7. The main threads 71 each have an upper leading edge 78 as well as an upper trailing edge 79. Hence each of the passages 72 for inserting food is partially delimited by one of the upper leading edges 78 and by one of the upper trailing edges 79. The main threads 71 widen toward the upper end of the pressing screw 7. Each of the main threads 71 has a lower face 73 extending over at least a quarter of the circumference of the pressing screw 7, and preferably over at least half of the circumference of the pressing screw 7, as can be seen in FIG. 4. The main threads 71 extend over at least two thirds of the height of the pressing screw 7 about the axis 15, as can be seen in FIG. 4.

As can be seen in FIGS. 4 and 5, at least one secondary thread 74 arranged between two main threads 71 is interrupted at a distance from the upper end of the pressing screw 7. Provision is made of upper drive configurations 75 on the upper end of the main threads 71 of the pressing screw 7. As shown in FIGS. 4 and 5, the upper drive configurations 75 are formed by cavities. Alternatively or additionally, the upper drive configurations 75 could comprise protuberances.

The pressing screw 7 comprises an axial passage 76, which can be seen in FIGS. 1, 4, and 5. More particularly, the pressing screw 7 rests on the filter element 5. The detachable pressing screw 7 can be driven in rotation by the upper drive output 12, which can be more readily seen in FIG. 6.

The pre-cutting disc 110 visible in FIG. 1 is arranged between the food insertion chute 40 and the pressing screw 7. The pre-cutting disc 110 is housed in the first compartment 6.

Figure 7:
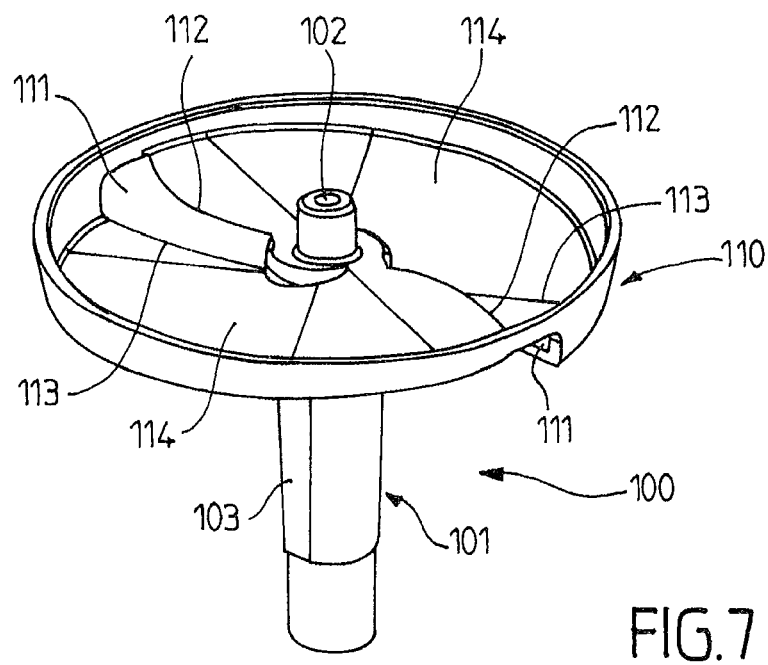
FIGS. 7 and 8 are perspective views from above and below, respectively, of a pre-cutting member housed in the work chamber of the appliance illustrated in FIG. 1.
Figure 8:
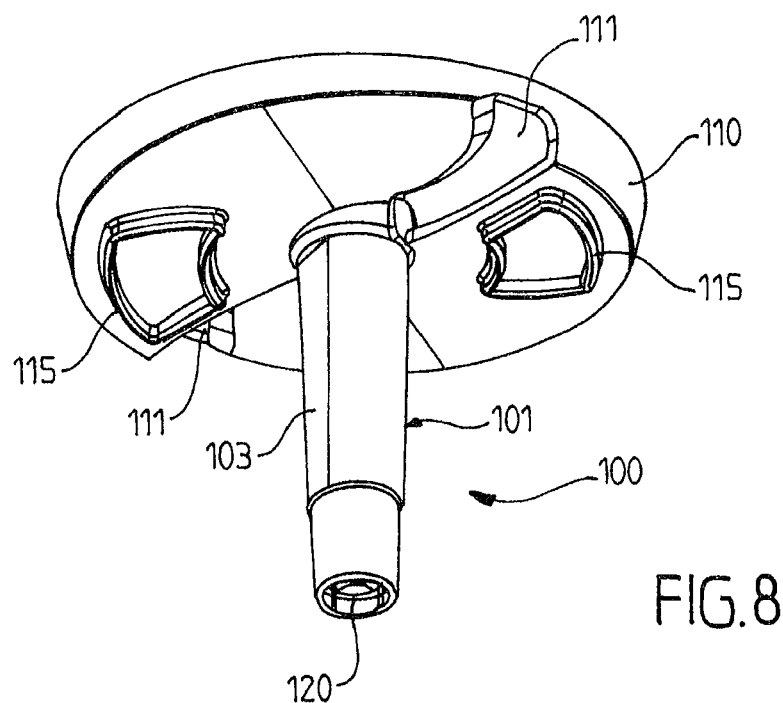

The pre-cutting disc 110 comprises at least one passage 111 for cut food, which is positioned opposite each passage 72 for inserting food. As can be seen in FIGS. 7 and 8, the pre-cutting disc 110 comprises two passages 111 for cut food, which are each arranged between an upper leading edge 112 and a lower support edge 113. Each lower support edge 113 extends to form a support surface 114 designed for receiving food exiting from the food insertion chute 40.

The pre-cutting disc 110 is detachable from the pressing screw 7. The pre-cutting disc 110 comprises lower drive configurations 115 designed for cooperating with the upper drive configurations 75 provided on the upper end of the main threads 71 of the pressing screw 7.

In the example of embodiment illustrated in FIGS. 1 through 8, the pressing screw 7 is driven in rotation by a rotary element 100 forming the pre-cutting disc 110. The rotary element 100 comprises a drive member 120 designed to be driven in rotation by the upper drive output 12, optionally by means of an additional transmission means. The rotary element 100 can be detached from the first compartment 6 via the upper opening of the work container 3.

As can be more readily seen in FIG. 8, the drive member 120 is provided in an end of a hub 101 projecting from the pre-cutting disc 110.

As can be seen in FIG. 7, the rotary element 100 comprises a recess 102 designed for receiving the axial guide member 42. The recess 102 is provided in the upper part of the hub 101. FIG. 1 shows the rotary element 100 in position in the first compartment 6 between the pressing screw 7 and the food insertion chute 40. More particularly, the rotary element 100 rests on the pressing screw 7. The rotary element 100 positioned on the pressing screw 7 arranged in the first compartment 6 drives the pressing screw 7 in rotation.

The rotary element 100 has a drive configuration 103, which can be seen more readily in FIGS. 5 and 6 and which is designed for cooperating with a drive configuration 77 associated with the pressing screw 7, which can be seen more readily in FIGS. 4 and 5.

More particularly, the drive configuration 103 is provided on the hub 101 and the associated drive configuration 77 is provided in the axial passage 76.

The appliance of the invention is employed and functions in the following manner.

The food inserted in the food insertion chute 40 is cut or sectioned by one or the other of the upper leading edges 112 of the pre-cutting disc 110 and passes through the corresponding passage 111 for cut food in order to reach the oppositely positioned passage 72 for inserting food.

The food is thus distributed more evenly around the pressing screw 7, especially in the upper part of the pressing screw 7, which improves the rotation thereof. A more uniform operation less subject to knocking is thus achievable, which in turn simplifies the retention and/or the driving of the pressing screw 7.

Alternatively, the pressing screw 7 could comprise at least two main threads 71 providing at least two separate passages 72 for inserting food, with preference given to each of said main threads 71 having a lower face 73 extending over at least a quarter of the circumference of the pressing screw 7.

Preference is given to the pressing screw 7 comprising between two and four main threads. Advantageously then, the pressing screw 7 has a 2, 3, or 4-fold symmetry.

Alternatively, the rotary element 100 installed between the upper drive output 12 and the pressing screw does not necessarily comprise a pre-cutting disc.

Alternatively, the upper leading edges 78 of the pressing screw 7 could form pre-cutting members.

Alternatively, the pressing screw 7 could comprise a drive member 120 designed to be driven in rotation by the upper drive output 12.

Alternatively, the axis 15 is not necessarily arranged in the vertical direction, but can be arranged in a mainly vertical direction having an angle less than or equal to 45° relative to the vertical direction.

Alternatively, the work container 3 does not necessarily house the main part of the pre-cutting disc 110 and/or the main part of the pressing screw 7 and/or the main part of the filter element 5.

Alternatively, the pressing screw 7 could be arranged in a work container 3 forming a channel connecting the food insertion chute to the discharge outlet, with a grate and a rotary blade arranged between the pressing screw and the discharge outlet for mincing the food compressed by the pressing screw 7. The work chamber 2 therefore does not necessarily house a filter element 5.

Alternatively, the work container 3 could be integrally formed with the case 1.

Alternatively, another discharge outlet for discharging the residues from the first compartment 6 to the outside and/or to a waste receptacle is conceivable.

The present invention is in no way limited to the examples of embodiment described herein, but encompasses numerous modifications in the scope of the claims.

The invention claimed is:

1. Electrical kitchen appliance comprising a pressing screw rotated about a substantially vertical axis in a work chamber having a food insertion chute communicating with an upper end of the pressing screw, and a discharge outlet, the pressing screw comprising at least two main threads providing at least two separate passages for inserting food, each main thread having a lower face extending over at least a quarter of a circumference of the pressing screw,
wherein the main threads each have an upper leading edge that form pre-cutting members,
wherein the lower face of each of the main threads extends over at least half of the circumference of the pressing screw, and the main threads extend over at least two-thirds of a height of the pressing screw about the axis, and
wherein the main threads each have an upper trailing edge, and in that each of the passages for inserting food is partially delimited by one of the upper leading edges and by one of the upper trailing edges.

2. Electrical kitchen appliance as in claim 1, characterized in that the main threads extend to an upper end of the pressing screw.

3. Electrical kitchen appliance as in claim 1, characterized in that at least one secondary thread arranged between two main threads is interrupted at a distance from the upper end of the pressing screw.

4. Electrical kitchen appliance as in claim 1, characterized in that the main threads widen towards the upper end of the pressing screw.

5. Electrical kitchen appliance as in claim 1, characterized in that the pressing screw is mounted detachably in the work chamber.

6. Electrical kitchen appliance as in claim 1, characterized in that it comprises a case housing an electric motor connected to an upper drive output designed for driving the pressing screw.

7. Electrical kitchen appliance as in claim 6, characterized in that the work chamber is mounted detachably on the case.

8. Electrical kitchen appliance as in claim 1, characterized in that the work chamber comprises a work container closed by a lid, with the work container having the discharge outlet, the lid having the food insertion chute.

9. Electrical kitchen appliance as in claim 1, characterized in that a filter element divides the work chamber into a first compartment housing the pressing screw and into a second compartment having the discharge outlet.

10. Electrical kitchen appliance as in claim 1, characterized in that the pressing screw has a 2, 3, or 4-fold symmetry.

11. Electrical kitchen appliance as in claim 1, wherein the pressing screw comprises between two and four main threads.

12. Electrical kitchen appliance as in claim 6, wherein the pressing screw comprises a drive member designed to be driven in rotation by the upper drive output.

13. Electrical kitchen appliance comprising a pressing screw rotated about a substantially vertical axis in a work chamber having a food insertion chute communicating with an upper end of the pressing screw, and a discharge outlet, the pressing screw comprising at least two main threads providing at least two separate passages for inserting food, each main thread having a lower face extending over at least a quarter of the circumference of the pressing screw, wherein a pre-cutting disc is arranged between the food insertion chute and the pressing screw, the pre-cutting disc comprising an upper leading edge, a lower support edge, and at least one passage for cut food positioned opposite each passage for inserting food, and wherein each passage for cut food is arranged between the upper leading edge and the lower support edge.

14. Electrical kitchen appliance as in claim 13, wherein each lower support edge extends to form a support surface designed for receiving food exiting from the food insertion chute.

15. Electrical kitchen appliance as in claim 13, wherein the pressing screw is driven by a rotary element forming the pre-cutting disc.

16. Electrical kitchen appliance as in claim 13, wherein the pre-cutting disc is detachable from the pressing screw.

17. Electrical kitchen appliance as in claim 16, wherein the pre-cutting disc comprises lower drive configurations designed for cooperating with upper drive configurations formed on the upper end of the main threads of the pressing screw.

\* \* \* \* \*